Dec. 21, 1965 B. L. STRATTON ETAL 3,225,310

AVALANCHE-TRIGGERED SAWTOOTH GENERATOR

Filed Jan. 7, 1964

BOYD L. STRATTON &
DONALD E. MORGAN
INVENTORS

BY James H. Griffin

ATTORNEY

United States Patent Office 3,225,310

Patented Dec. 21, 1965

3,225,310

AVALANCHE-TRIGGERED SAWTOOTH GENERATOR

Boyd L. Stratton, Woodside, and Donald E. Morgan, Mountain View, Calif., assignors to Ampex Corporation, Redwood City, Calif., a corporation of California Filed Jan. 7, 1964, Ser. No. 336,168

5 Claims. (Cl. 331—111)

This invention relates to Sawtooth-Generators and more particularly to an Avalanche-Triggered Variable High Frequency Linear Sawtooth Generator.

The sawtooth generator has many applications in the electronic servo area. Its output waveform, divided into a gradually rising portion and a quickly dropping portion, can be used in sweep circuits, phase comparators and synchronization systems of oscilloscopes, radar, TV, and magnetic tape recorders.

Up to the present, most sawtooth generator circuits have used a thyratron or the like, a charging capacitor in parallel therewith, and various auxiliary components. The thyratron requires an external trigger such as a square wave impressed on its grid in order to create conductive and nonconductive phases. Moreover, thyratrons and gas tubes in general are too slow in behavior for high frequency applications. Substitution of semi-conductors has increased the high frequency capabilities of sawtooth circuits somewhat; but transistor sawtooth generator circuits, except a few limited to low frequencies, either require external triggering or have a bottoming period of constant voltage after reset and before charging.

It is, therefore, a general object of this invention to provide an improved sawtooth generator that does not require an external trigger pulse;

Another object of this invention is to provide a variable frequency linear sawtooth waveform generator with a very fast reset time;

Another object is to provide an improved sawtooth generator for use at high frequencies, of the order of .5 mc. and higher;

Another object is to provide a sawtooth generator circuit which is capable of a very short discharge time or high recovery time.

In the accomplishment of these objects, applicants' invention features a regenerative feedback sawtooth generator circuit which uses avalanche-breakdown off-on conductive elements. The circuit comprises a charging capacitor across which the output signal is taken, a source of constant current in series with the charging capacitor, and an avalanche-breakdown element in parallel with the charging capacitor. In order to minimize the discharge time of the capacitor, the avalanche-breakdown element has a feedback circuit such that the current resulting from its own breakdown causes it to be maintained in a highly conductive state until the capacitor is fully discharged. Thus, the capacitor discharge is nearly tripled; the discharge time is minimized; and the high frequency capability of applicants' circuit is obtained.

Other objects and features of applicants' invention and a better understanding thereof may be had by reference to the following description and claims taken in conjunction with the accompanying drawing, in which:

Figure 1:
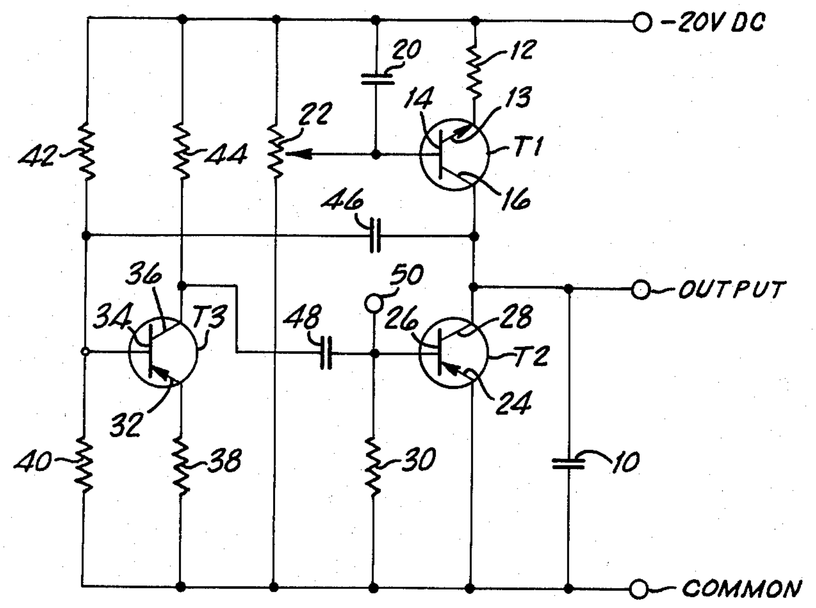
FIGURE 1 is a schematic circuit diagram of one embodiment of the invention.

Referring to FIGURE 1, an avalanche-triggered sawtooth generator in accordance with applicants' invention may be constructed around a charging capacitor 10 coupled across an output terminal and a common terminal.

A transistor T1 in series with a resistor 12 appears between the charging capacitor 10 and a power supply. A transistor T1, having an emitter 13, base 14 and collector 16 is provided to supply constant current to the charging capacitor 10. The collector 16 is directly coupled to the charging capacitor 10; the emitter 13 is coupled through the resistor 12 to the power supply. The base 14 is coupled to the power supply through the parallel circuit consisting of a blocking capacitor 20 and a voltage divider 22.

An avalanche-breakdown transistor T2 having an emitter 24, base 26, and collector 28 is connected in parallel with the capacitor 10, the emitter 24 being directly coupled to the common lead. The base 26 is coupled to the common lead through a bias resistor 30.

A transistor T3 acts as a switch in the feedback circuit and has an emitter 32, a base 34 and a collector 36. The emitter 32 is coupled to the common lead through a resistor 38. The base 34 is coupled to the common lead through a resistor 40 and is coupled to the power supply through a resistor 42. The collector 36 is coupled to the power supply through a resistor 44.

The base of the transistor T3 is coupled through a capacitor 46 to the junction of the output side of the capacitor 10. The collector 36 of the transistor T3 is coupled to the base 26 of the transistor T2 through a capacitor 48. There may be also coupled to the base 26 of the transistor T2 a lead 50 for the application of a negative external trigger pulse to synchronize the reset of the sawtooth circuit.

Figure 2:
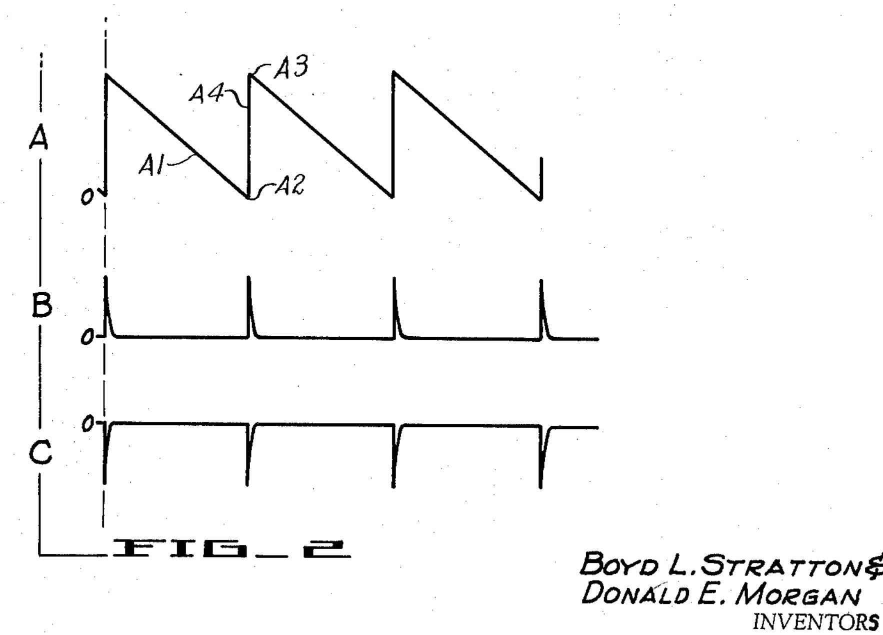
FIGURE 2 illustrates a series of waveforms useful in explaining the operation of the circuit of FIGURE 1.

In the operation of the above-described circuit, the transistor T1 supplies a constant current to the junction of its collector 16 with the capacitor 10. During the charging portion of its cycle, the capacitor 10 accepts the current from the transistor T1 and, in charging, causes the voltage between the output and the common leads to rise substantially linearly (FIGURE 2, A1).

When the voltage across the capacitor 10 reaches the breakdown voltage of the transistor T2 (FIGURE 2, A2), that transistor becomes highly conductive and the capacitor 10 begins to discharge through it. The sudden change in current flow occasioned by the breakdown of the transistor T2 causes a positive pulse (FIGURE 2, B) to appear across the capacitor 46 and thus at the base 34 of the transistor T3.

During the portion of the cycle in which the capacitor 10 is charging and the transistor T2 is in a nonconducting state, the transistor T3 is in a conductive state and, accordingly, the constant current across the resistor 44 is blocked by the capacitor 48 but passes easily through the transistor T3 and the resistor 38 to common. When the positive pulse across the capacitor 46 is applied to the base 34, it cuts off the transistor T3, so that no current flows through the resistor 38. The result is that the current path from the power supply through the resistor 44 is switched from the transistor T3 and the resistor 38 to the capacitor 48 and the resistor 30. The resulting waveform across the capacitor 48 is shown in FIGURE 2, C. Although relatively short in duration, this negative voltage across the capacitor 48 is applied to the base 26 of the transistor T2 for the precise time interval needed to keep the transistor T3 conducting until the capacitor 10 has been almost completely discharged.

By the time that the capacitor 10 has discharged to the point where the voltage at the output lead is almost zero again (FIGURE 2, A3), the transistor T2 has become nonconductive. Since the positive pulse across the capacitor 46 has gone down again, permitting the transistor T3 to return to the conductive state, the charging cycle of the capacitor 48 reverts to its linear charging phase (FIGURE 2, A1), and another sawtooth wave is begun.

An avalanche-triggered sawtooth generator in accordance with the above description and drawing was built and operated using the following components:

Transistors:
- T2–2N711
- T3–2N711

Resistors:
- 12–100 ohms
- 22–100K
- 30–8200 ohms
- 38–200 ohms
- 40–4700 ohms
- 42–47K
- 44–10K Capacitors:
- 10–500 pf.
- 20–.1 mf.
- 46–10 pf.
- 48–12 pf.

Variation of the resistor 22 produced a frequency range of 15 kc. to 4 mc., and this circuit achieved a 10% to 90% reset time (FIGURE 2, A4) of 50 nanoseconds, which remained constant throughout the frequency range. The resistors 38, 40 and 42 hold the transistor T3 just at saturation, so that switching time will be minimized.

A number of alternative arrangements will readily suggest themselves to those skilled in the art. For example, NPN type transistors may be substituted for PNP, and vice versa, merely by reversing the collector voltage polarity. In general, however, applicants' invention lies in providing an avalanche-triggered sawtooth generator with greater capacitor discharge, shorter discharge time, and thus wider frequency range than was heretofore possible.

What is claimed is:

1. A circuit for generating sawtooth waveforms including: a charging capacitor, an avalanche-breakdown off-on conducting element having first and second electrodes connected in parallel with said capacitor and having a third control electrode, said conducting element being conductive in response to a predetermined threshold breakdown potential difference between said first and third electrodes, means coupled to said capacitor to supply charging current thereto, said current charging said capacitor to establish said predetermined breakdown potential difference whereupon said conducting element is rendered conductive to discharge said capacitor and a feedback circuit coupled between said first and third electrodes, said feedback circuit including sensing means coupled to said first electrode for sensing the initiation and termination of discharge of said capacitor and responsively generating a signal persisting for the duration of discharge, and switched bias means coupled to said sensing means and to said third electrode for applying a bias thereto responsive to said signal to maintain said predetermined threshold potential until said discharge is terminated.

2. A circuit for generating sawtooth waveforms comprising: a charging capacitor, a source of constant current in series with said capacitor, an avalanche-breakdown transistor having its emitter and collector connected in parallel with said capacitor, discharge sensing means coupled to said capacitor for generating a signal during discharge thereof, and a biasing circuit responsively coupled to said sensing means and coupled to the base of said breakdown transistor, said biasing circuit including switching means and first and second alternative bias means, said switching means coupling said first and second bias means to said base of said transistor and having first and second states wherein bias is applied to said base respectively from said first and second bias means, said switching means coupled to said sensing means and being switched from said first to said second state responsive to said signal, said first alternative bias means supplying a bias for rendering said avalanche-breakdown transistor non-conductive below a predetermined breakdown potential between said emitter and collector of said transistor established as said charging capacitor charges, said second alternative bias means supplying a bias for rendering said avalanche-breakdown transistor conductive during discharge of said capacitor.

3. A circuit for generating a sawtooth waveform comprising: a charging capacitor, an output terminal coupled to one end of said charging capacitor, a common terminal coupled to the other end of said charging capacitor, a source of constant current in series with said capacitor, an avalanche-breakdown transistor in parallel with said capacitor, the collector of said transistor coupled to said output terminal, the emitter of said transistor coupled to said common terminal, a bias resistor coupled between the base of said avalanche-breakdown transistor and said common terminal for rendering said transistor non-conductive until said capacitor charges to a predetermined breakdown potential, an active switching element having first, second and third terminals, a second capacitor coupling said first terminal of said switching element, to the base of said avalanche-breakdown transistor, said terminal of said switching element connected to said common terminal, bias means coupled to the terminals of said active switching element to render same normally conductive through said first and second terminals thereof, and a feedback circuit connected between the collector of said avalanche-breakdown transistor and the third terminal of said active switching element for supplying a cutoff signal thereto for terminating conduction between said first and second terminals thereof responsive to conduction of said transistor.

4. A circuit for generating sawtooth waveforms comprising: a first capacitor, an output terminal coupled to one end of said first capacitor, a common terminal coupled to the other end of said first capacitor, a power supply, a first transistor coupled between said power supply and said first capacitor and having multiple electrodes, one of said electrodes being coupled directly to said first capacitor, another of said electrodes being coupled to said power supply, and another said electrode being coupled to a voltage divider, a second transistor of the avalanche-breakdown type in parallel with said first capacitor, the collector of said second transistor coupled to said output terminal, the emitter of said second transistor coupled to said common terminal, the base of said second transistor coupled through a resistor to said common terminal, a third transistor having multiple electrodes, one of said electrodes being coupled through a second capacitor to said first capacitor and another said electrode being coupled through a third capacitor to the base of said second transistor, said third transistor being so biased and arranged that said second transistor will be nonconductive while said first capacitor is being charged to a pre-set voltage, will shift to a conductive state when said first capacitor reaches said pre-set voltage, and will continue in the conductive state until said first capacitor is substantially discharged.

5. A circuit for generating sawtooth waveforms comprising a charging capacitor, output and common terminals respectively coupled to the opposite ends of said capacitor, a constant current source coupled to the junction between said capacitor and output terminal, a first avalanche-breakdown transistor having base, emitter, and collector electrodes, said emitter and collector electrodes respectively connected to the opposite ends of said capacitor, a resistor connected between said base electrode and said common terminal, a second transistor having base, emitter, and collector electrodes, said emitter and base electrodes of said second transistor coupled to said common terminal, a bias supply coupled to said base and collector electrodes of said second transistor to render same normally conducting, a second capacitor coupled between said collector electrode of said first transistor and base electrode of said second transistor, and a third capacitor coupled between said collector electrode of said second transistor and said base electrode of said first transistor.

References Cited by the Examiner

UNITED STATES PATENTS 2,428,926 10/1947 Bliss ---------------- 331—131

FOREIGN PATENTS 604,939 7/1948 Great Britain.

OTHER REFERENCES

Macaria, Electronic Engineering, "Avalanche Transistors" May 1959, pp. 262–267.

Institute of Electrical Engineers Journal, September 1957, pp. 509, 510.

ROY LAKE, *Primary Examiner.*

JOHN KOMINSKI, *Examiner.*